United States Patent

(12) United States Patent
Rehg et al.

(10) Patent No.: US 8,909,025 B2
(45) Date of Patent: Dec. 9, 2014

(54) SYSTEMS AND METHODS FOR RETRIEVING CAUSAL SETS OF EVENTS FROM UNSTRUCTURED SIGNALS

(75) Inventors: James M. Rehg, Atlanta, GA (US);
Karthir Prabhakar, Atlanta, GA (US);
Sangmin Oh, Clifton Park, NY (US);
Ping Wang, Atlanta, GA (US); Gregory D. Abowd, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 13/427,610

(22) Filed: Mar. 22, 2012

(65) Prior Publication Data

US 2012/0301105 A1    Nov. 29, 2012

Related U.S. Application Data

(60) Provisional application No. 61/466,071, filed on Mar. 22, 2011.

(51) Int. Cl.
*H04N 5/91* (2006.01)
*H04N 9/80* (2006.01)
*G06K 9/00* (2006.01)

(52) U.S. Cl.
CPC ................................ *G06K 9/00718* (2013.01)
USPC ........................................ 386/241; 386/239

(58) Field of Classification Search
None
See application file for complete search history.

(56) References Cited

U.S. PATENT DOCUMENTS

| | | | |
|---|---|---|---|
| 7,426,301 | B2 | 9/2008 | Porikli |
| 2010/0135528 | A1 | 6/2010 | Bobbitt et al. |
| 2011/0028827 | A1 | 2/2011 | Sitaram et al. |
| 2012/0008819 | A1 | 1/2012 | Ding et al. |
| 2012/0177294 | A1* | 7/2012 | Ke et al. .................. 382/197 |

OTHER PUBLICATIONS

Geweke, John, "Measurement of Linear Dependence and Feedback Between Multiple Time Series", Journal of the American Statistical Associate (JASA), vol. 77, No. 378, Jun. 1982, pp. 304-313.
Walden, A., "A Unified View of Multitaper Multivariate Spectral Estimation", Biometrika, 2000, vol. 87, No. 4, pp. 767-788.

* cited by examiner

*Primary Examiner* — Hung Dang
*Assistant Examiner* — Sunghyoun Park
(74) *Attorney, Agent, or Firm* — Troutman Sanders LLP; Ryan A. Schneider; Jay R. Anderson

(57) ABSTRACT

A method for providing improved performance in retrieving and classifying causal sets of events from an unstructured signal can comprise applying a temporal-causal analysis to the unstructured signal. The temporal-causal analysis can comprise representing the occurrence times of visual events from an unstructured signal as a set of point processes. An exemplary embodiment can comprise interpreting a set of visual codewords produced by a space-time-dictionary representation of the unstructured video sequence as the set of point processes. A nonparametric estimate of the cross-spectrum between pairs of point processes can be obtained. In an exemplary embodiment, a spectral version of the pairwise test for Granger causality can be applied to the nonparametric estimate to identify patterns of interactions between visual codewords and group them into semantically meaningful independent causal sets. The method can further comprise leveraging the segmentation achieved during temporal causal analysis to improve performance in categorizing causal sets.

10 Claims, 5 Drawing Sheets

(a) Frame 77    (b) Frame 85    (c) Frame 257    (d) Frame 266

SYSTEMS AND METHODS FOR RETRIEVING CAUSAL SETS OF EVENTS FROM UNSTRUCTURED SIGNALS

CROSS-REFERENCE TO RELATED APPLICATIONS

This application claims priority and the benefit under 35 U.S.C. §119(e) of U.S. Provisional Patent Application 61/446,071, filed 22 Mar. 2011, the entire contents and substance of which are hereby incorporated by reference as if fully set forth below.

TECHNICAL FIELD

Various aspects of the present invention relate to causal analysis techniques and, more particularly, to causal analysis techniques for unstructured video content.

BACKGROUND

In some situations, it may be desirable to organize video data into sets of events with associated temporal dependencies. For example, a soccer goal could be explained using a vocabulary of events such as passing, dribbling, and tackling. In describing dependencies between events, it is natural to invoke the concept of causality: A foot striking a ball causes its motion. Likewise, a car accident causes a traffic jam.

There is a rich literature in psychology and cognitive science on event perception and causality. Within the vision literature, there have been several attempts to develop models of causality that are suitable for video analysis. A representative example is the work of Mann, Jepson, and Siskind on event analysis using the Newtonian laws of motion. When domain models are available, as in the case of physics or sporting events, causal relations can be expressed in terms of events with "high-level" semantic meaning. However, connecting these models to pixel data remains challenging. Moreover, the lack of general domain theories makes it difficult to apply this approach to general video content. Thus, domain model video analysis is unsuitable to analyze unstructured video content, such as content that is untagged or otherwise undefined.

SUMMARY

There is a need for effective causal analysis systems and methods applicable to unstructured video content. Preferably, such systems and methods are applicable to commonly-used event-based representations, such as video codewords. There is a further need for effective activity labeling systems and methods for categorizing causal sets. It is to such systems and methods that various embodiments of the invention are directed.

Various embodiments of the invention are causal analysis systems and methods. An exemplary embodiment of the causal analysis method can comprise an encoding stage and an analysis stage. The encoding stage can encode video sequences in a nonparametric spectral format. The analysis stage can apply causal analysis techniques suitable for use with nonparametric data. Some embodiments further comprise a categorization stage, which can which leverage the segmentation from causal analysis to provide improved performance in categorizing causal sets.

An exemplary embodiment of the causal analysis system can comprise an encoding unit, analysis unit, and a categorization unit, which can be analogous to the stages of the causal analysis method.

During the encoding stage, a video sequence can be provided as a spectral representation of one or more point-processes, which can be generated from visual codewords. Encoding can be achieved by building a dictionary of visual codewords from the video sequence. These visual codewords can be used to define a vocabulary of visual events and encode recurring motions. Each codeword can then be represented as a point-process. In some embodiments, the set of point-processes generated by each of the visual codewords can be represented as a multivariate point-process.

The statistical relation between pairs of point-processes can be represented as a nonparametric estimate of the cross-spectrum between such pairs. The cross-spectrum captures a measure of co-occurrence as a function of frequency between two processes. In an exemplary embodiment, a nonparametric estimate of covariance can be obtained from a cross-correlogram of event time slices using a cross-covariance density function. The cross-spectrum can be obtained from the Fourier transform of the cross-covariance density function. In an exemplary embodiment, a multitaper method (Walden, "A unified view of multitaper multivariate spectral estimation," *Biometrika*, 2000) can be used to estimate the cross-spectrum with minimal leakage. In some embodiments, the cross-spectrum between each pair of point-processes can be organized as a spectral matrix.

During the analysis stage, the spectral representation of video content can be analyzed using one or more causal analysis techniques, such as nonparametric causal analysis techniques. In an exemplary embodiment, a frequency domain formulation of Granger causality—or some other statistical test for quantifying influence—can be used to make predictions of temporal causality, resulting in a causal score for each pair of point-processes.

In some embodiments, the resulting causal scores can be filtered using statistical thresholding to identify causal sets. In an exemplary embodiment, an empirical null-hypothesis can be used to select a threshold to achieve a desired level of causal significance. The causal sets identified can provide a segmentation of the video based on the temporal interactions between visual event data. In some embodiments, causally significant sets can be represented as an edge graph.

During the categorization stage, a representative causal set can be identified that contains a good segmentation of the desired interaction. A good segmentation can be defined to contain most of the interaction and little undesirable clutter. The representative set can be used for various purposes. Exemplarily, a maximum bag margin formulation of Multiple Instance Learning (MI-SVM) can be used where a single causal set is chosen as the representative instance for the video.

In another embodiment, multiple instance learning via embedded instance selection (MILES) can be used to transform the multiple instance problem to that of a standard supervised problem, without the need to relate particular instances to their labels. This can be accomplished by mapping a bag, e.g., the video, into a feature space defined by causal sets in a training set.

It will be understood that, although the causal analysis systems and methods are described above as relating to a video signal, other signal types may also be analyzed by various embodiments of the invention.

These and other objects, features, and advantages of the invention will become more apparent upon reading the following specification in conjunction with the accompanying drawing figures.

DETAILED DESCRIPTION

Figure 1A:
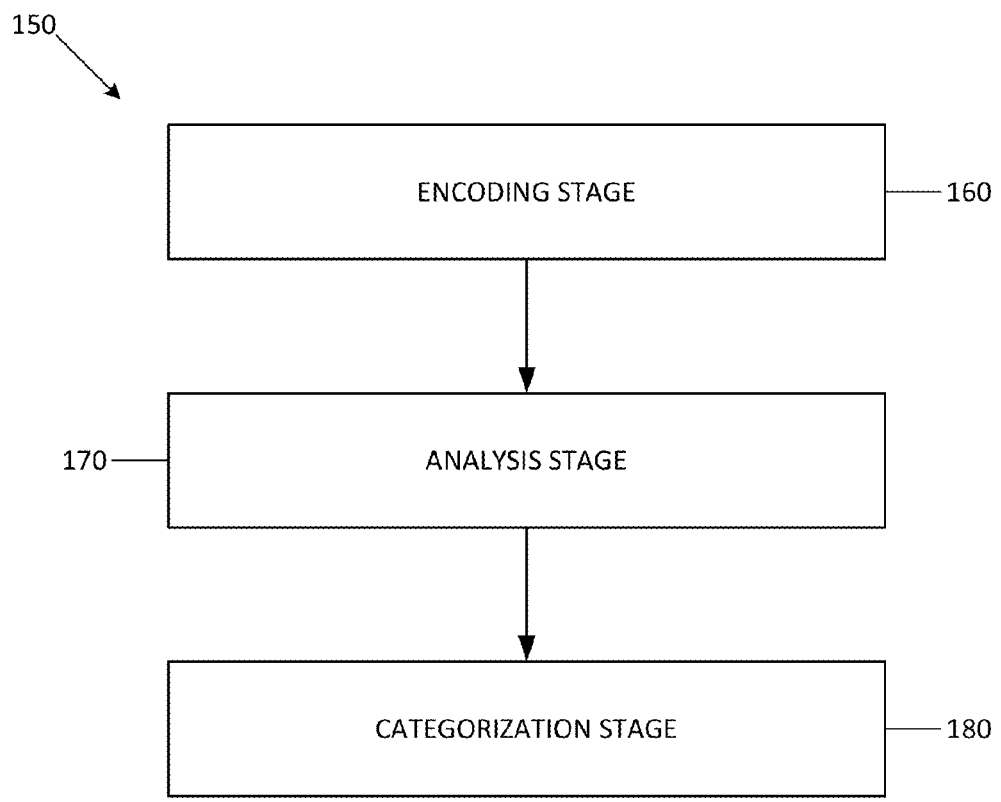
FIG. 1A illustrates a flow diagram of various stages of a causal analysis method, according to an exemplary embodiment of the present invention.

To facilitate an understanding of the principles and features of the invention, various illustrative embodiments are explained below. In particular, the invention is described in the context of being causal analysis systems and methods for retrieving and classifying causal events from unstructured video content. Embodiments of the invention, however, need not be limited to this context. Rather, embodiments of the systems and methods may be used for causal analysis of various types of structured and unstructured signals. For example, and not limitation, some embodiments of the invention can provide causal analysis of audio signals, accelerometry signals capturing body movements, and galvanic skin response measurements and other physiological measures. Further, although exemplary embodiments may be especially well adapted for the analysis of general video content with significant event "noise," they can be used to causally analyze more structured content.

The components described hereinafter as making up various elements of the invention are intended to be illustrative and not restrictive. Many suitable components that would perform the same or similar functions as components described herein are intended to be embraced within the scope of the causal analysis systems and methods. Such other components not described herein may include, but are not limited to, for example, components developed after development of the invention.

Various embodiments of the present invention are causal analysis systems and methods for retrieving and classifying causal events from video or other content. Referring now to the figures, in which like reference numerals represent like parts throughout the views, various embodiments of the causal analysis systems and methods will be described in detail.

Figure 1B:
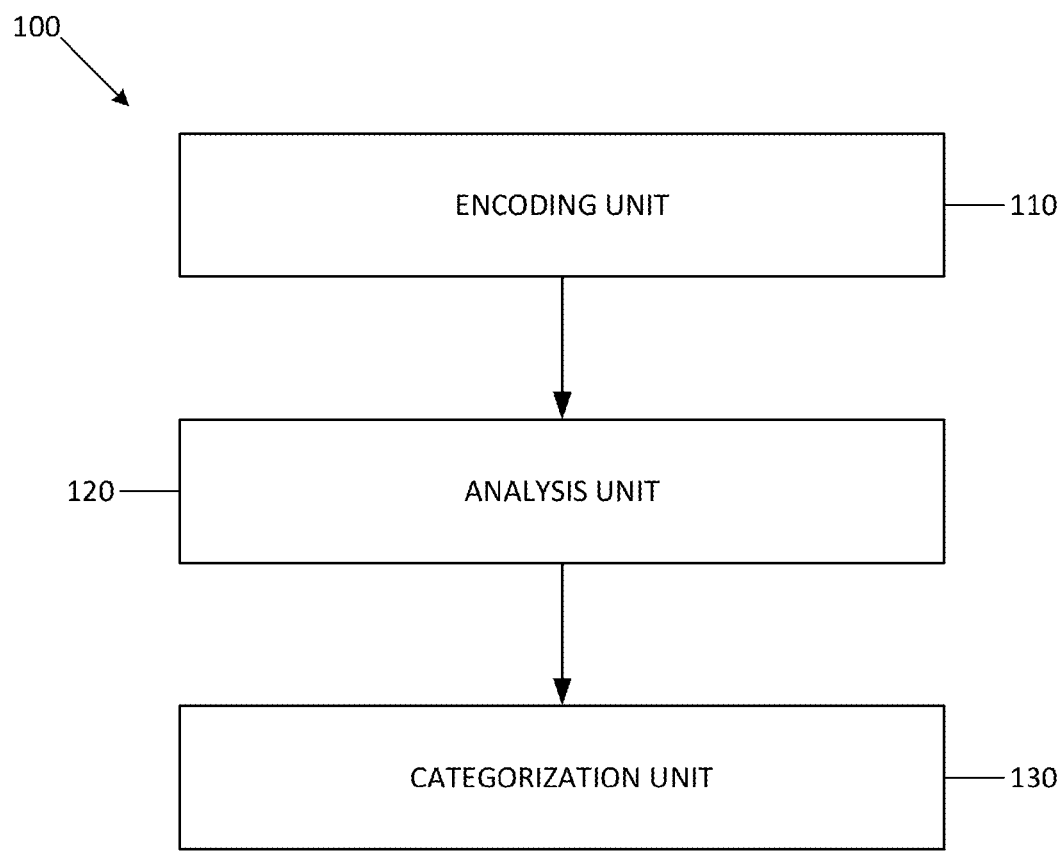
FIG. 1B illustrates a flow diagram of various units of a causal analysis system, according to an exemplary embodiment of the present invention.

FIGS. 1A-1B illustrate flow diagrams of the causal analysis method and system, according to exemplary embodiments of the present invention. As shown in FIG. 1A, the method 150 can comprise an encoding stage 160, an analysis stage 170, and a categorization stage 180. In the causal analysis system 100 of FIG. 1B, the operations for these stages can be performed by, respectively, an encoding unit 110, an analysis unit 120, and a categorization unit 130. The various stages and units of the causal analysis systems 100 and methods 150 can be embodied, at least in part, in a non-transitory computer readable medium for execution by a processing device.

It will be understood that that the stages and units shown in FIGS. 1A-1B are provided for illustrative purposed only, and that the causal analysis systems and methods can include alternative or additional stages or units as well. It will be further understood that the various stages and units can be implemented in various manners, and they may comprise hardware, software, or a combination thereof. Further, the distinctions between these units made throughout this disclosure is an illustrative operative distinction only, and thus, these various stages and units may be implemented by shared hardware or software.

I. The Encoding Stage

Representing Video Content as Point-Processes

In the encoding stage, a video sequence can be encoded by a dictionary of visual events whose occurrence times comprise a set of point-processes. In some embodiments, the encoding can be achieved by building a dictionary of visual events corresponding to spatio-temporal visual codewords which are extracted from the video sequence. Spatio-temporal visual codewords can occur in a subset of video frames and correspond to codewords in the object categorization techniques. These visual codewords can be used to define a vocabulary of visual events and encode recurring motions. Each visual codeword can then be represented as a point-process. In some embodiments, the set of point-processes generated by each of the visual codewords can be represented as a multivariate point-process.

Although not strictly required for some embodiments of the causal analysis systems and methods, representing the set of point-processes as a multivariate point-process can be helpful in visualizing the technique. Thus, without limiting the invention's embodiments, this disclosure will refer to the set of point-processes as a multivariate point-process.

Other means for defining a vocabulary of visual events for encoding the video sequence include the detection of specific motion patterns, objects, or actions within the video sequence. For example, a parts detector could be used to identify the movement of body parts such as arms or legs, resulting in an alternative set of visual events. These visual events can then be represented as a point-process based on their times of occurrence throughout the video sequence.

In an exemplary embodiment, visual events can be defined by means of an interest point detector, such as the space-time interest point detector available from Ivan Laptev. The detector can be applied to the video sequence in order to select suitable interest points. An interest point p can have a feature vector $f_p$ comprising two components: position-dependent histograms of oriented gradients (HoG) and optical flow (HoF) from p's space-time neighborhood. Spatio-temporal visual codewords can be built by applying k-means clustering to the set of interest points $\{f_p\}$. In an exemplary embodiment, an interest point can be assigned to the closest spatio-temporal visual codeword.

A spatio-temporal visual codeword can occur in a subset of frames, with frame numbers $\{t_1\}$, and can therefore be represented as a point-process, where $\overline{N}_1(t)$ counts the number of occurrences of the event type i in the interval (0, t]. A key defining property of a point-process is that events can be defined based on only their time of occurrence. The number of events in a small interval dt can be $d\overline{N}_i(t) = \overline{N}_i(t+dt) - \overline{N}_1(t)$, and $E\{c\bar{N}_i(t)\}/dt=\lambda_i$ can be the mean intensity of the process $\bar{N}_i(t)$. The zero-mean process can be $N_i(t)=\bar{N}_i(t)-\lambda_i t$. Point-processes generated by the m visual codewords in a video sequence can form an m-dimensional multivariate point-process with counting vector $N(t)=(N_1(t), N_2(t), \ldots, N_m(t))^T$. In exemplary embodiments, it can be assumed that the process defined by N(t) is zero-mean, wide-sense stationary, mixing, and orderly.

Figure 2A:
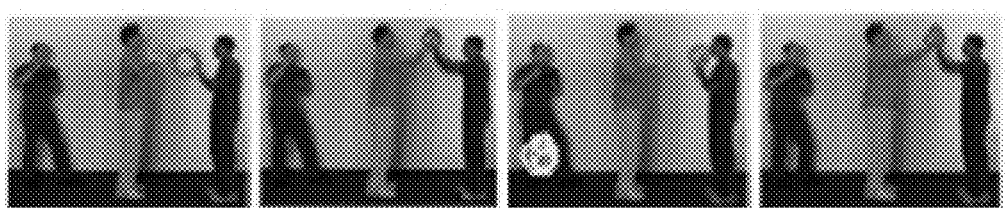
FIGS. 2A-2B illustrate an analysis of selected frames of a video sequence, according to an exemplary embodiment of the present invention.
Figure 2B:
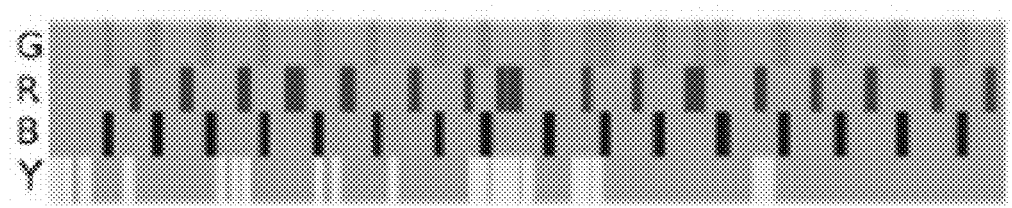

An example is shown in FIGS. 2A-2B, which illustrate analysis of selected frames of a video sequence, according to an exemplary embodiment of the present invention. FIG. 2A illustrates the selected frames of the video sequence. The sequence includes occurrences of a patty-cake game with a secondary "noise" motion, where the noise motion is movement other than the patty-cake sequence. Four point-processes corresponding to the visual codewords are shown in the co-occurrence matrix, as illustrated in FIG. 2B. The highlighted processes in the frames of FIG. 2A correspond to the hand-going-up stage (frames 77 and 257) of the patty-cake game and the hands-touching stage (frames 85 and 266) of the patty-cake game. The noise motion (frame 257) is also highlighted in FIG. 2A.

From the temporal ordering of the processes in the co-occurrence matrix, it can be observed that the two hands-going-up processes (of the two participants) co-cause and co-occur, and they cause the hand-touching process. It can likewise be observed that the noise process occurs independently of the others.

Constructing a Spectral Representation of the Multivariate Point-Process

Performing a pairwise causal analysis between point-processes in the multivariate point-process comprises representing the statistical relationship between two point-processes $\bar{N}_i(t)$ and $N_i(t)$. This relationship can be captured by the cross covariance density function $R_{i,j}(\tau)$ at lag $\tau$, which is analogous to the cross-correlation function in a vector time-series model:

$$R_{i,j}(\tau) = \frac{E[dN_{i(t)}dN_j(t+\tau)]}{dt d\tau} - 1[i=j]\lambda_i\delta(\tau),$$

where $\delta(\tau)$ is the classical Kronecker delta function. The auto-covariance when i=j can be handled as a special case via the indicator function 1[b] for Boolean b. The indicator function has value one when the Boolean expression b is true, and zero when it is false. In the definition of the cross covariance, the indicator function makes it possible to represent the auto covariance in the case where a process is being compared to itself, i.e., the case where i=j.

In an exemplary embodiment, a nonparametric estimate of the cross-covariance can be obtained from a cross-correlogram: The time axis (0, T] can be divided into w bins, and a histogram of events can be computed at each bin. The event data can be successively re-binned by taking each occurrence of an event of type i, shifting the time origin so that this event occurs at time zero, and then re-binning the events of type j. The normalized count in bin k of the resulting histogram can give an estimate of the probability that an event j will arrive at a lag of kw after event i, that is $R_{i,j}(kw)$. Similarly, auto-covariance can be estimated by dividing the time axis into w bins and calculating the probability of an event occurring at each bin.

The cross-spectrum $S_{i,j}(f)$ between processes $N_i$ and $N_j$ can be obtained using the Fourier transform of the cross-covariance density function, and the auto-spectrum $s_{i,i}(f)$ of process $N_i$ can be obtained using Fourier transform of the auto-covariance density function.

In some embodiments, the cross-spectrum and auto-spectrum of the point-processes can be organized into a spectral matrix. Although not strictly required for systems and methods according to the present invention, representing the cross-spectrum and auto-spectrum as a spectral matrix can be helpful in visualizing the technique. Thus, without limiting the various embodiments of the invention, this disclosure will refer to the cross-spectrums and auto-spectrums of the point-processes of the multivariate point-process as a spectral matrix.

A spectral matrix for the multivariate point-process N(t) can be formed from the auto-spectrums (diagonal elements) and the cross-spectrums (off-diagonal elements):

$$\begin{bmatrix} S_{1,1}(f) & \cdots & S_{1,m}(f) \\ \vdots & \ddots & \vdots \\ S_{m,1}(f) & \cdots & S_{m,m}(f) \end{bmatrix} \quad (2)$$

The spectrum can be represented compactly as:

$$S_{i,j}(f) = \frac{1}{2\pi}\int_{-\infty}^{\infty} \exp(-2\pi i f\tau)R_{i,j}(\tau)d\tau + 1[i=j]\frac{\lambda_i}{2\pi} \quad (3)$$

A key computational challenge is the computation of the spectral matrix from sequences of multivariate event data in an efficient and numerically stable manner. The practical considerations of avoiding bias and leakage are the same for event data as they are for time series spectrum estimation. In an exemplary embodiment, a multitaper method can be used to estimate the spectrum to mitigate leakage. In the multitaper method, K data tapers $\{h_k\}_{k=1}^K$ are applied successively to the ith event and the Fourier transform can be applied to obtain:

$$\tilde{M}_i(f,k) = \int_0^T h_k(t)\exp(-2\pi i f t)dN_i(t) \quad (4)$$
$$= \sum_j h_k(t_j)\exp(-2\pi i f t_j)$$

Figure 3A:
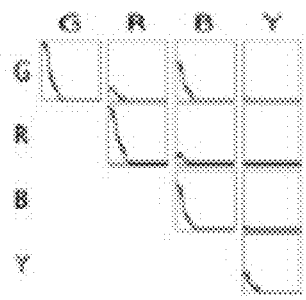
FIG. 3A illustrates a spectral matrix, according to an exemplary embodiment of the present invention.

Estimates for the spectral matrix elements $S_{i,j}(f)$ using $\tilde{M}$ can be obtained as:

$$\tilde{S}_{i,j}(f) = \frac{1}{2\pi KT}\sum_{k=1}^K \tilde{M}_i(f,k)\tilde{M}_j(f,k)^*, \quad (5)$$

where w* denotes the complex-conjugate transpose of w. A visualization of the spectral matrix for the processes in FIG. 2B is shown in FIG. 3A, where the y-axis denotes magnitude of the spectral components and the x-axis denotes frequency. The cross-spectrum can capture a measure of co-occurrence as a function of frequency between two processes. Processes that co-occur, such as the hands-going-up processes in the patty-cake example, can generally have high energy in their cross-spectrum components.

II. The Analysis Stage

Identifying Causal Sets Using Pairwise Granger Causality

The analysis stage can apply causal analysis techniques suitable for nonparametric data to the output of the encoding stage. A key advantage of the spectral characterization of point-process data is that it permits the estimation of Granger causality using the spectral factorization method of Geweke. Although this method was developed for the case of time series data, it can be applied to a more general spectral representation.

Although embodiments of the causal analysis systems and methods are described below as applying a formulation of the pairwise test for Granger causality to retrieve and classify causal events, those of skill in the art will recognize that the concepts of the invention are not limited to analysis using formulations of Granger causality. Other causal analysis techniques suitable for quantifying a degree of influence can be added or substituted in place of the Granger causality determination described herein.

The causal test for time-series data can be stated as follows: Consider two vector autoregressive processes, $$x_t = \sum_{i=1}^{\infty} a_{1i} x_{t-i} + u_{1t}, \operatorname{var}(u_{1t}) = \sum_1 \tag{6}$$

$$y_t = \sum_{i=1}^{\infty} b_{1i} x_{t-i} + v_{1t}, \operatorname{var}(v_{1t}) = \Gamma_1 \tag{7}$$

which can be viewed as linear projections of $x_t$ and $y_t$ on their own past values, which we denote as $X_{t-1}$ and $Y_{t-1}$ respectively. The linear projection of $x_t$ on both $X_{t-1}$ and $Y_{t-1}$, and of $y_t$ on both $X_{t-1}$ and $Y_{t-1}$, can be obtained from the joint autoregressive process:

$$x_t = \sum_{i=1}^{\infty} a_{2i} x_{t-i} + \sum_{i=1}^{\infty} c_{2i} y_{t-i} + u_{2t}, \operatorname{var}(u_{2t}) = \sum_2 \tag{8}$$

$$y_t = \sum_{i=1}^{\infty} b_{2i} y_{t-i} + \sum_{i=1}^{\infty} d_{2i} x_{t-i} + v_{2t}, \operatorname{var}(v_{2t}) = \Gamma_2 \tag{9}$$

The variance $\Sigma_1$ in Equation 6 represents the error in predicting the present value of $x_t$ from its own past, while the variance $\Sigma_2$ in Equation 8 represents the error in predicting the present value of $x_t$ from the past values of both $X_{t-1}$ and $Y_{t-1}$. If $\Sigma_2$ is less than $\Sigma_1$, then Y can be said to cause X. This intuition can be captured by the causal measure:

$$F_{y \to x} = \ln(|\Sigma_1|/|\Sigma_2|). \tag{10}$$

In an exemplary embodiment, a frequency domain formulation of Granger causality can be used based on the cross-spectral representation of pairwise point-processes in the spectral matrix. The decomposition of $F_{y \to x}$ by frequency can be constructed by considering the following system:

$$\begin{bmatrix} a_2 \tau & c_2 \tau \\ d_2 \tau & b_2 \tau \end{bmatrix} \begin{pmatrix} x_t \\ y_t \end{pmatrix} = \begin{pmatrix} u_{2t} \\ v_{2t} \end{pmatrix} \tag{11}$$

where $\Sigma$ is the lag operator, and the coefficient matrix is denoted as $C(\tau)$. An expression for the spectral matrix of the joint process $[x_t, y_t]$ can be obtained from the inverted Fourier transform of the above, as follows:

$$S(f) = T(f) \Sigma T(f) \tag{12}$$

In this equation, $T(f)$ is the transfer function, defined as the inverse of the Fourier transform of the coefficient matrix $C(\tau)$, and $\Sigma$ is the covariance of the noise process.

When $u_{2t}$ and $v_{2t}$ in are correlated, there is an instantaneous causality which makes it more difficult to attribute the power of $x_t$ appropriately. In an exemplary embodiment, a transformation can be used to remove the instantaneous causality, resulting in a modified transfer function $\tilde{T}(f)$. The auto-spectrum of $x_t$ can then be represented as:

$$S_{x,x} = \tilde{T}_{x,x}(f) \Sigma_2 \tilde{T}_{x,x}^*(f) + T_{x,y}(f) \tilde{\Gamma}_2 T_{x,y}^*(f). \tag{13}$$

The first term in the above equation is the intrinsic power, and the second term is the causal power of $x_t$ due to $y_t$, which identifies the total power of $x_t$ at frequency $f$ that is contributed by $y_t$. The causal measure from Y to X can then be defined as:

$$G_{Y \to X}(f) = \ln \left( \frac{|S_{x,x}(f)|}{\left| \tilde{T}_{x,x}(f) \sum_2 (y, x) \tilde{T}_{x,x}^*(f) \right|} \right). \tag{14}$$

The causal measure from X to Y can follow by symmetry.

Equations 12 and 13 above can be viewed as defining a factorization of the spectral matrix from Equation 2, which can yield the terms that are needed to compute the causal measure via Equation 14. In the case of time series data, these terms can be computed directly by fitting an auto-regressive model to the data. In the point-process case, according to an exemplary embodiment, the spectral matrix can be estimated directly using Equation 5. The factorization in Equation 12 can then be obtained using direct numerical factorization techniques. Thus, exemplary embodiments of the causal analysis systems and methods can compute causal measures without the need to fit parametric models to the data.

Figure 3B:
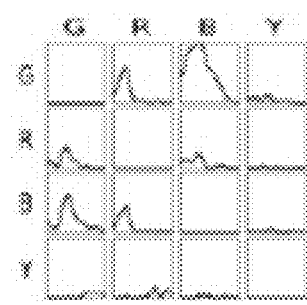
FIG. 3B illustrates causal measures, according to an exemplary embodiment of the present invention.

FIG. 3B illustrates plots of causal measures, $G_{j \to i}(f)$, which were computed from the spectral matrix in FIG. 3A using Equation 14, according to an exemplary embodiment.

Figure 3C:
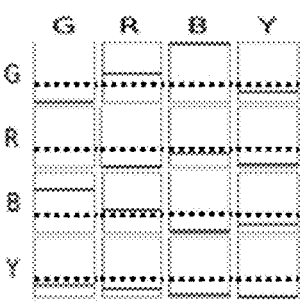
FIG. 3C illustrates causal scores and threshold score values, according to an exemplary embodiment of the present invention.

A scalar causal score can be obtained from each casual measure by integrating over frequency. The m pairwise causal scores can be summarized in a causal matrix as follows:

$$C(i, j) = 0, \forall i = \sum_f G_{j \to i}(f), \forall i \neq j \tag{15}$$

where $C(i,i)=0$, $\forall i$. FIG. 3C illustrates the causal scores as horizontal lines, according to an exemplary embodiment of the causal analysis systems and methods.

In some embodiments, causal scores can be filtered using a threshold value in order to segment events into causal sets. An empirical null-hypothesis testing framework can be used to compute the threshold that corresponds to a desired significance level. The following steps can be repeated to obtain an empirical distribution for the null hypothesis: (1) Pairs of point processes are selected at random, and their event data is shuffled. (2) Causal scores are computed from this randomized surrogate data, and the aggregation of these scores yields a distribution.

A threshold can then be chosen to achieve a desired level of significance with respect to this distribution. FIG. 3C illustrates the application of a threshold value (as illustrated by dotted line) as compared to a causal score matrix, according to an exemplary embodiment of the present invention. Causal scores that exceed the threshold can correspond to detected pairwise relationships.

Figure 3D:
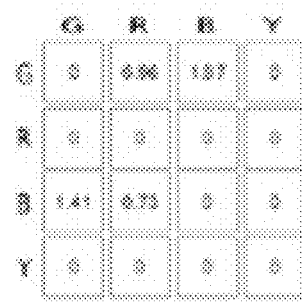
FIG. 3D illustrates a resulting causal matrix, according to an exemplary embodiment of the present invention.
Figure 3E:
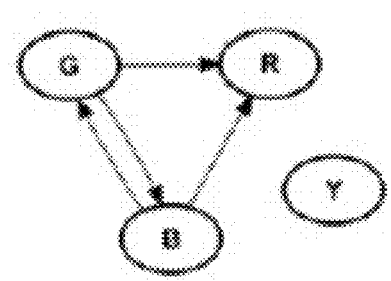
FIG. 3E illustrated a causal graph, as an interpretation of the causal matrix in FIG. 3D, according to an exemplary embodiment of the present invention.

FIG. 3D illustrates the resulting causal matrix, according to an exemplary embodiment of the present invention. The causal matrix can be interpreted as a directed causal graph where edges denote causal influence, as shown in FIG. 3E. The connected components of the graph represent causal sets.

Note that the exemplary graph in FIG. 3E contains two causal sets, corresponding to the patty-cake interaction and the noise process. The causal sets can provide a segmentation of the video based on the temporal interactions between visual event data. In this example, they identify the presence of two independent processes.

III. Categorization

Systems and methods according to embodiments of the present invention can leverage the segmentation achieved during temporal causal analysis. In some embodiments, standard multiple instance learning (MIL) techniques can be modified to provide improved performance in categorizing causal sets. Two such embodiments, QP-MISVM, a quasi-periodic modification of maximum bag margin formulation of MIL (MI-SVM), and QP-MILES, a quasi-periodic modification of multiple instance learning via embedded instance selection (MILES), are described herein. However, systems and methods of the present invention are not limited to performing categorization using these particular techniques.

Causal sets can be thought of as instances in a MIL problem where the label of the bag, i.e., the video, is known, but the labels of the instances, i.e., the causal sets, are unknown. In a MIL framework, the labels for the instance can be automatically inferred from the labels of the bag.

For each instance in a bag, a spatio-temporal bag-of-features (BoF) representation can be built by constructing a visual vocabulary with k-means clustering from features sampled in training videos. Each feature in a given instance can be assigned to its closest vocabulary-word, and a histogram can be computed of visual codeword occurrences over a space-time volume corresponding to various spatio-temporal grids. Then each bag for a video sequence can be represented as a set of histograms of visual codewords in each causal set for each channel, where each channel is a combination of a spatial and temporal grid along with either a HoG or HoF descriptor.

In a standard MI-SVM formulation, a classifier is initially trained on the average representation of all the instances in each positive bag and all of the negative instances in each negative bag. The margin of the positive bag is defined by the margin of the most positive instance, and the margin of a negative bag is defined by the margin of the least negative instance. The instances in the positive bags are evaluated against the learned decision function, and the instance that maximizes the decision value in each positive bag is chosen as the new representative instance of the bag. This process is repeated until convergence, when the assignments of the representative instances do not change. However, such a representation is not robust when there are many negative instances in the bag that can skew the initialization.

According to an exemplary embodiment, MI-SVM can be extended to leverage the repetitive structure in turn-taking interactions, via the notion of quasi-periodicity. A causal set exhibits quasi-periodic structure if it is possible to map the set of point processes in the set to a sequence of keyframe symbols which exhibit repetition. For example, in a video containing a patty-cake game, a causal set might contain the arm movements of the players. In this case the different motions in the game, such as clapping, would define the keyframes. The sequence of keyframe symbols is not required to exhibit exact repetition, but may contain instances where a repeating symbol might be missing (if that part of the game was not performed during one repetition) or a new symbol might be inserted (corresponding to some other action, such as answering a cell phone, which was not part of the interaction). In the method of Wang, Abowd, and Rehg (Temporal Causality for the Analysis of Visual Events, CVPR, 2010), the quasi-periodicity of a video sequence is measured using a scoring function. This same quasi-periodic scoring function can be applied to the analysis of causal sets of point processes. In this case, the causal sets corresponding to an interaction will have high quasi-periodic scores, while causal sets corresponding to background or camera motion will tend to have low quasi-periodic scores.

For each instance in the bag, quasi-periodic patterns can be extracted as follows: Each frame of the sequence can be represented by the histogram of visual codewords that are contained in the instance, and an event label e can be assigned to each frame by applying k-means clustering to the histogram representation of frames. For each event e, event information that measures the importance of a particular event can be defined as $I(e)=-\log_{|E|}p(e)$, where $|E|$ denotes the total number of events, and $p(e)$ is the frequency of e in the sequence. The more frequently an event occurs, the less information it carries. For each pattern, pattern information I(pat) can be obtained by computing the sum of unique events u in the pattern pat, as follows:

$$I(pat) = \sum_i I(u_i) \quad (16)$$

The quasi-periodic score can then be computed by:

$$G(pat)=I(pat)*(Occur(pat)-1) \quad (17)$$

where Occur(pat) is the number of occurrences of the pattern. In some embodiments, the quasi-periodic scores can be compared against a minimum-gain (e.g. min-gain=1), and only the patterns that exceed this measure are accepted.

A modified MI-SVM (QP-SVM) can leverage quasi-periodic scores in a discriminative framework by biasing the MI-SVM initialization and update steps with those patterns that have high quasi-periodic scores.

For each instance in a given bag, its quasi-periodic score can be computed from the above equation. The positive bags can be initialized by averaging over all the instances in the bag that have quasi-periodic scores above min-gain. This can bias the initialization toward patterns that have repetitive structure. Initialization for the negative bags can be the same as in or similar to the MI-SVM formulation. During each iteration, the representative instance for the positive bag can be chosen as the instance that gives the maximum value for the linear combination of the learned decision function and the quasi-periodic score:

$$I^* = \underset{c \in B}{\operatorname{argmax}} \alpha f_c + \beta G(Pat_c) \quad (18)$$

where c is the set of causal sets in the bag B, and are the mixing values.

In a standard MILES formulation, each bag is embedded into the instance-space by measuring the similarity between each instance $x^k$ in the training set and a bag $B_i$, and it is defined by the closest instance in the bag. A bag is then mapped into the instance-space. The intuition behind this embedding is that if some instance $x^i$ achieves high similarity to some positive bags and low similarity to some negative bags, then the feature $x^i$ is useful in categorizing the bags. This mapping will result in a sparse embedding since only certain instances will have high similarity to bags of some category. An issue with such a representation in our task is that there are many more negative instances than positive instances, and the resulting embedding will not likely be sparse.

In an exemplary embodiment, quasi-periodic scores can be leveraged to extend MILES. Instead of using all the instances for embedding a bag, a small subset of concept class instances $c^m$ can be created to correspond to instances in the training set that have high quasi-periodic scores. Then, a bag can be embedded in the space of this new concept class similarly as the original definition:

$$s(c^m, B_i) = \max_j \exp\left(-\frac{\|x_{ij} - c^m\|^2}{\sigma^2}\right) \quad (19)$$

and the embedding is now into the smaller concept class space:

$$B_i' = [s(c^1, B_i), \ldots, s(c^m, B_i)]^T \quad (20)$$

By selecting instances with high quasi-periodic scores from among the total set of instances, we are able to produce a smaller concept class space, since low scoring instances are omitted. The reduction in the size of concept class space allows us to retain the sparseness of the instance-space embedding which is the key to successful performance of the MILES formulation.

IV. Exemplary Computing Systems

Figure 4:
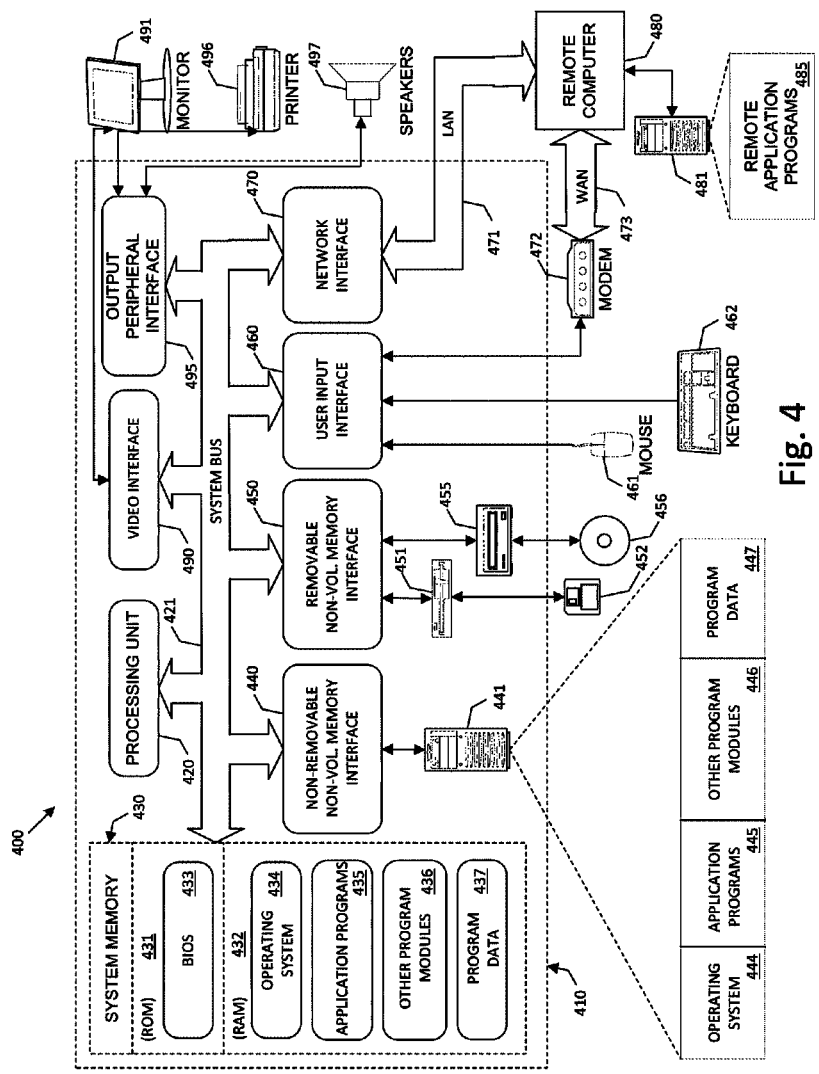
FIG. 4 illustrates an exemplary computing system in which the causal analysis systems and methods can be implemented, according to an exemplary embodiment of the present invention.

FIG. 4 illustrates an architecture of an exemplary computing device used for implementation of the causal analysis system, according to an exemplary embodiment of the present invention. As mentioned above, one or more aspects of the causal analysis system 100 and related methods 150 can be embodied, in whole or in part, in a computing device 400. FIG. 4 illustrates an example of a suitable computing device 400 that can be used.

Although specific components of a computing device 400 are illustrated in FIG. 4, the depiction of these components in lieu of others does not limit the scope of the invention. Rather, various types of computing devices 400 can be used to implement embodiments of the causal analysis system 100. Exemplary embodiments of the causal analysis system 100 can be operational with numerous other general purpose or special purpose computing system environments or configurations.

Exemplary embodiments of the causal analysis system 100 can be described in a general context of computer-executable instructions, such as one or more applications or program modules, stored on a computer-readable medium and executed by a computer processing unit. Generally, program modules can include routines, programs, objects, components, or data structures that perform particular tasks or implement particular abstract data types.

With reference to FIG. 4, components of the computing device 400 can comprise, without limitation, a processing unit 420 and a system memory 430. A system bus 421 can couple various system components including the system memory 430 to the processing unit 420.

The computing device 400 can include a variety of computer readable media. Computer-readable media can be any available media that can be accessed by the computing device 400, including both volatile and nonvolatile, removable and non-removable media. For example, and not limitation, computer-readable media can comprise computer storage media and communication media. Computer storage media can include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store data accessible by the computing device 400. For example, and not limitation, communication media can include wired media such as a wired network or direct-wired connection, and wireless media such as acoustic, RF, infrared and other wireless media. Combinations of any of the above can also be included within the scope of computer readable media.

The system memory 430 can comprise computer storage media in the form of volatile or nonvolatile memory such as read only memory (ROM) 431 and random access memory (RAM) 432. A basic input/output system 433 (BIOS), containing the basic routines that help to transfer information between elements within the computing device 400, such as during start-up, can typically be stored in the ROM 431. The RAM 432 typically contains data and/or program modules that are immediately accessible to and/or presently in operation by the processing unit 420. For example, and not limitation, FIG. 4 illustrates operating system 434, application programs 435, other program modules 436, and program data 437.

The computing device 400 can also include other removable or non-removable, volatile or nonvolatile computer storage media. By way of example only, FIG. 4 illustrates a hard disk drive 441 that can read from or write to non-removable, nonvolatile magnetic media, a magnetic disk drive 451 for reading or writing to a nonvolatile magnetic disk 452, and an optical disk drive 455 for reading or writing to a nonvolatile optical disk 456, such as a CD ROM or other optical media. Other computer storage media that can be used in the exemplary operating environment can include magnetic tape cassettes, flash memory cards, digital versatile disks, digital video tape, solid state RAM, solid state ROM, and the like. The hard disk drive 441 can be connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4 can provide storage of computer readable instructions, data structures, program modules and other data for the computing device 400. For example, hard disk drive 441 is illustrated as storing an operating system 444, application programs 445, other program modules 446, and program data 447. These components can either be the same as or different from operating system 434, application programs 435, other program modules 436, and program data 437.

A web browser application program 435, or web client, can be stored on the hard disk drive 441 or other storage media. The web client 435 can request and render web pages, such as those written in Hypertext Markup Language, in another markup language, or in a scripting language.

A user of the computing device 400 can enter commands and information into the computing device 400 through input devices such as a keyboard 462 and pointing device 461, commonly referred to as a mouse, trackball, or touch pad. Other input devices (not shown) can include a microphone, joystick, game pad, satellite dish, scanner, electronic white board, or the like. These and other input devices are often connected to the processing unit 420 through a user input interface 460 coupled to the system bus 421, but can be connected by other interface and bus structures, such as a parallel port, game port, or a universal serial bus. A monitor 491 or other type of display device can also be connected to the system bus 421 via an interface, such as a video interface 490. In addition to the monitor, the computing device 400 can also include other peripheral output devices such as speakers 497 and a printer 4%. These can be connected through an output peripheral interface 495.

The computing device 400 can operate in a networked environment, being in communication with one or more remote computers 480 over a network. The remote computer 480 can be a personal computer, a server, a router, a network PC, a peer device, or other common network node, and can include many or all of the elements described above relative to the computing device 400, including a memory storage device 481.

When used in a LAN networking environment, the computing device 400 can be connected to the LAN 471 through a network interface or adapter 470. When used in a WAN networking environment, the computing device 400 can include a modem 472 or other means for establishing communications over the WAN 473, such as the internet. The modem 472, which can be internal or external, can be connected to the system bus 421 via the user input interface 460 or other appropriate mechanism. In a networked environment, program modules depicted relative to the computing device 400 can be stored in the remote memory storage device. For example, and not limitation, FIG. 4 illustrates remote application programs 485 as residing on memory storage device 481. It will be appreciated that the network connections shown are exemplary and other means of establishing a communications link between computers can be used.

While the causal analysis systems and methods have been disclosed in exemplary forms, it will be apparent to those skilled in the art that many modifications, additions, and deletions may be made without departing from the spirit and scope of these methods, systems, and their equivalents, as set forth in the following claims.

The invention claimed is:

1. A computer program product embodied in a non-transitory computer-readable medium, the computer program product comprising an algorithm adapted to effectuate a method for analyzing visual events comprising:
   selecting a plurality of visual events in a visual recording, wherein a visual event is a local visual feature occurring over a plurality of video frames;
   for one or more occurrences of the plurality of visual events, representing an occurrence of a visual event as a point process, to create a plurality of point processes;
   constructing a non-parametric representation of the plurality of point processes; and
   identifying, between pairs of point processes, causal sets providing evidence of causal relationships between the pairs of point processes;
   wherein the non-parametric representation of the plurality of point processes is an estimate of a cross-spectral density function.

2. The computer program product of claim 1, wherein the cross-spectral density function is based on a Fourier transform of a covariance density function.

3. The computer program product of claim 1, wherein the estimate of the cross-spectral density function is represented as a spectral matrix.

4. The computer program product of claim 1, the method further comprising categorizing the causal sets, using multiple instance learning and at least partially based on quasi-periodic scores, wherein quasi-periodic scores are produced by measuring repetitiveness of keyframes.

5. The computer program product of claim 4, wherein categorizing causal sets comprises applying a quasi-periodic version of a maximum bag margin formulation analytical technique, wherein: for each instance in a given bag, its quasi-periodic score is computed; positive bags are initialized by averaging over all the instances in the bag that have quasiperiodic scores above a minimum gain; and the instances in the positive bags are evaluated against a learned decision function until convergence, wherein during each iteration, the representative instance for the positive bag is chosen as the instance that gives the maximum value for the linear combination of the learned decision function and the quasi-periodic score.

6. The computer program product of claim 4, wherein categorizing causal sets comprises applying a quasi-periodic version of a multiple instance learning via embedded instance selection analytical technique, wherein a subset of concept class instances is created to correspond to instances in the training set that have high quasi-periodic score.

7. A computer program product embodied in a non-transitory computer-readable medium, the computer program product comprising an algorithm adapted to effectuate a method for analyzing visual events comprising:
   selecting a plurality of visual events in a visual recording, wherein a visual event is a local visual feature occurring over a plurality of video frames;
   for one or more occurrences of the plurality of visual events, representing an occurrence of a visual event as a point process, to create a plurality of point processes;
   constructing a non-parametric representation of the plurality of point processes; and
   identifying, between pairs of point processes, causal sets providing evidence of causal relationships between the pairs of point processes;
   wherein the causal sets are identified using a frequency domain formulation of Granger Causality applied to the non-parametric representation to produce pairwise causal scores.

8. The computer program product of claim 7, wherein identifying causal sets comprises grouping co-occurring visual codewords into causal sets based on the pairwise causal scores.

9. The computer program product of claim 7, wherein identifying causal sets further comprises determining a threshold causal score value and comparing the threshold causal score to the pairwise causal scores.

10. The computer program product of claim 9, wherein determining the threshold causal score value comprises:
    selecting point processes at random;
    shuffling event data of the point processes;
    computing causal scores from the event data;
    aggregating the causal scores to create a distribution; and
    selecting a causal score from the distribution to achieve a desired level of causal significance.

* * * * *